United States Patent
Huang et al.

(10) Patent No.: US 6,736,227 B2
(45) Date of Patent: May 18, 2004

(54) TRANSMISSION BEING CAPABLE OF TRANSMITTING TORQUE FROM AN ENGINE AND/OR A GENERATOR AND MOTOR UNIT TO AN OUTPUT SHAFT IN A MOTOR VEHICLE

(75) Inventors: Hui-Huay Huang, Yungkang (TW); Wen-Chang Chen, Yungkang (TW); Shih-Chang Wu, Yungkang (TW)

(73) Assignee: JI-EE Industry Co., Ltd., Tainan Hsien (TW)

( * ) Notice: Subject to any disclaimer, the term of this patent is extended or adjusted under 35 U.S.C. 154(b) by 114 days.

(21) Appl. No.: 10/172,950

(22) Filed: Jun. 18, 2002

(65) Prior Publication Data

US 2003/0230442 A1 Dec. 18, 2003

(51) Int. Cl.[7] .................................................. B60K 6/04
(52) U.S. Cl. ..................................... 180/65.2; 180/65.4
(58) Field of Search ............................... 180/65.2, 65.3, 180/65.4; 192/43.1, 41 R; 477/6; 474/84

(56) References Cited

U.S. PATENT DOCUMENTS

| | | | |
|---|---|---|---|
| 4,407,132 A | * 10/1983 | Kawakatsu et al. ........... 60/716 |
| 4,455,490 A | * 6/1984 | Giardini et al. ........... 290/38 A |
| 4,588,040 A | * 5/1986 | Albright. et al. ............ 180/165 |
| 4,616,742 A | * 10/1986 | Matsushita ............... 192/84.94 |
| 5,664,635 A | * 9/1997 | Koga et al. ................ 180/65.3 |
| 5,667,029 A | * 9/1997 | Urban et al. ............... 180/65.2 |
| 6,109,127 A | * 8/2000 | Liau ......................... 74/336 B |
| 6,155,366 A | * 12/2000 | Lin ............................ 180/65.2 |
| 6,186,916 B1 | * 2/2001 | Blanchard .................... 474/14 |
| 6,302,227 B1 | * 10/2001 | Takemura et al. ......... 180/65.2 |
| 6,524,216 B2 | * 2/2003 | Suzuki et al. .................. 477/3 |

* cited by examiner

Primary Examiner—Frank Vanaman
(74) Attorney, Agent, or Firm—Morgan Lewis & Bockius LLP (57) ABSTRACT

A transmission for a motor vehicle includes a controller for controlling an engine, a generator and motor unit, a converter, and a storage battery unit. A detecting mechanism is used to detect the operating conditions of the motor vehicle and the engine so as to generate control signals. A power distribution device is disposed between the engine and the generator and motor unit. The generator and motor unit can be controlled to operate in one of a generator mode and a motor mode.

3 Claims, 9 Drawing Sheets

TRANSMISSION BEING CAPABLE OF TRANSMITTING TORQUE FROM AN ENGINE AND/OR A GENERATOR AND MOTOR UNIT TO AN OUTPUT SHAFT IN A MOTOR VEHICLE

BACKGROUND OF THE INVENTION

1. Field of the Invention

This invention relates to a transmission for a motor vehicle, and more particularly to a transmission that can transmit torque from an engine and/or a generator and motor unit to an output shaft.

2. Description of the Related Art

Figure 1:
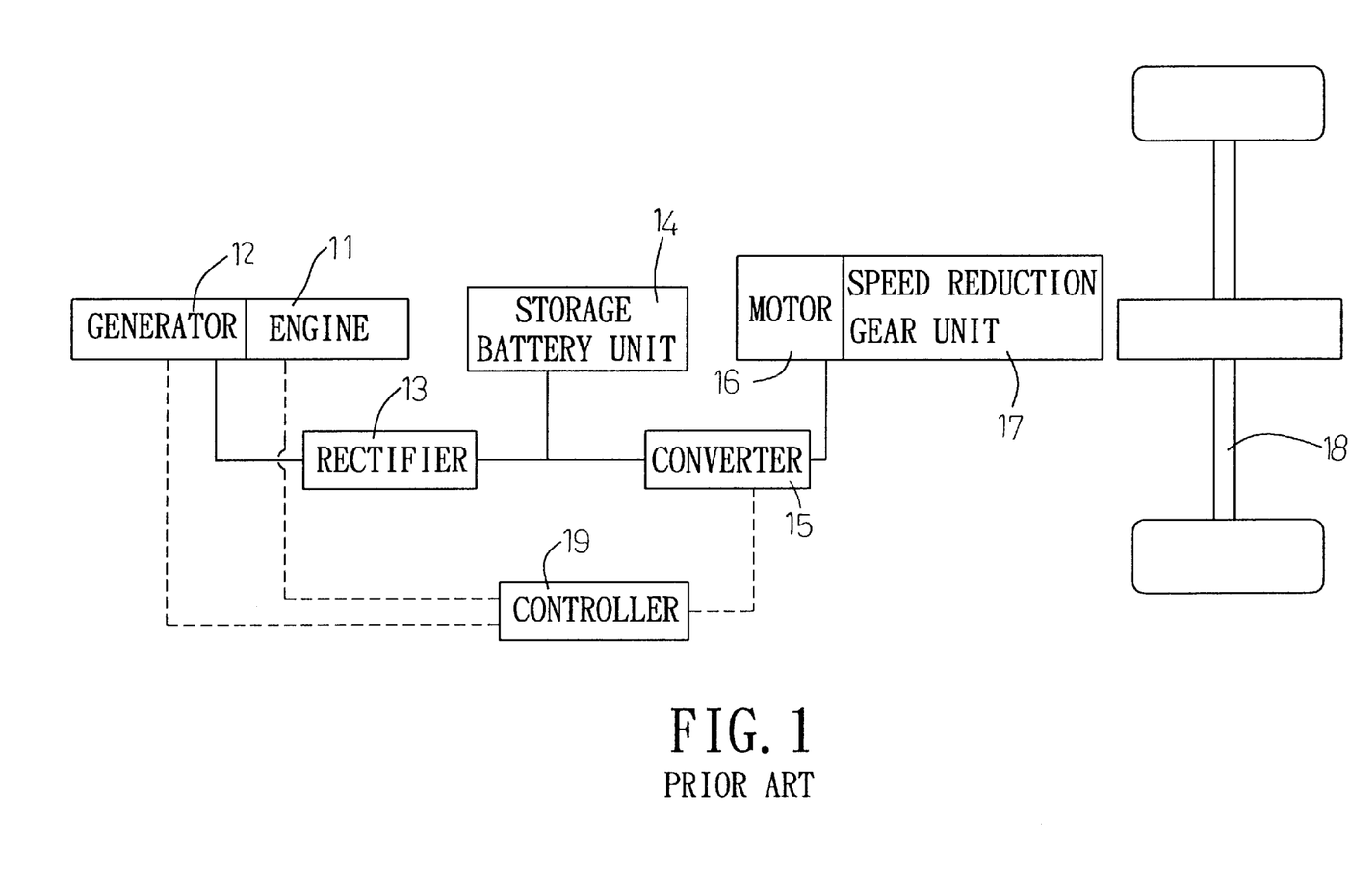
FIG. 1 is a block diagram of an in-series connection type conventional transmission for a motor vehicle.

Referring to FIG. 1, an in-series connection type conventional transmission for a motor vehicle is shown to include an engine 11, a generator 12, a rectifier 13, a storage battery unit 14, a converter 15, a motor 16, a speed reduction gear unit 17, an output shaft 18, and a controller 19. Power generated from the engine 11 activates the generator 12 to create alternating current that is passed through the rectifier 13 so as to be converted into direct current, which is stored within the storage battery unit 14. When it is desired to start the motor vehicle, the storage battery unit 14 supplies direct current, which is converted by the converter 15 into an electric current that can be utilized by the motor 16 so that the motor 16 can rotate the speed reduction gear unit 17 and thus the output shaft 18. The engine 11, the generator 12, and the converter 15 are controlled by the controller 19. A drawback associated with the aforesaid conventional transmission is that energy loss is relatively large during conversion between electric energy and dynamic energy.

Figure 2:
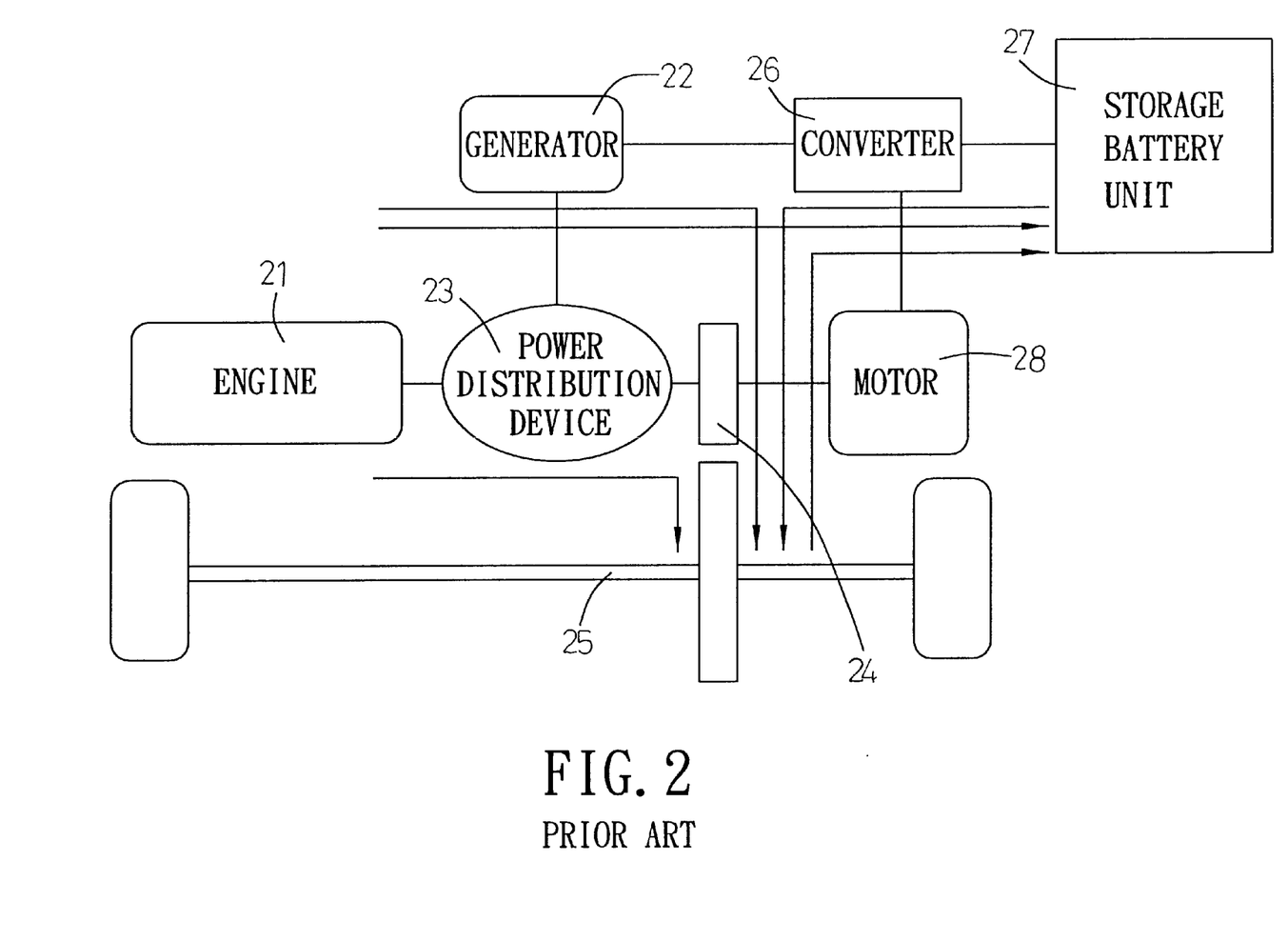
FIG. 2 is a block diagram of an in-parallel connection type conventional transmission for a motor vehicle.

To reduce the energy loss, an in-parallel connection type conventional transmission is developed. Referring to FIG. 2, the in-parallel connection type conventional transmission is shown to include an engine 21, a generator 22, a power distribution device 23, a speed reduction gear unit 24, an output shaft 25, a converter 26, a storage battery unit 27, and a motor 28. The engine 21 and the generator 22 are interconnected by means of the power distribution device 23. The power distribution device 23 is connected to the speed reduction gear unit 24 so as to transmit power to the output shaft 25. The generator 22 is connected to the storage battery unit 27 via the converter 26. The motor 28 is disposed between the converter 26 and the speed reduction gear unit 24.

Figure 3:
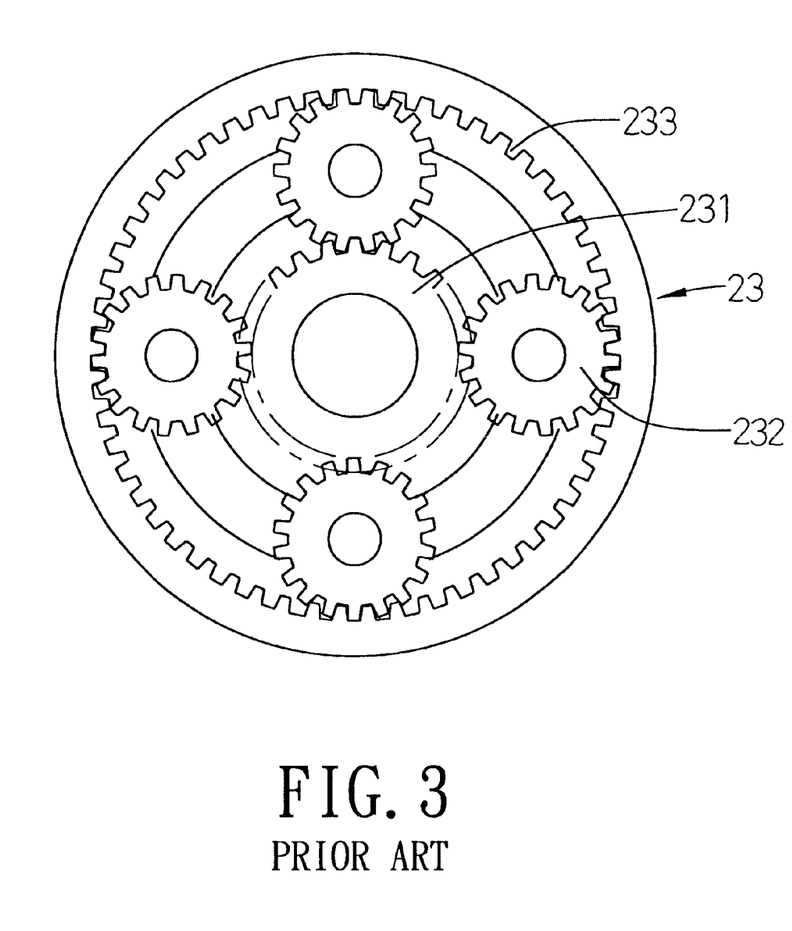
FIG. 3 illustrates a power distribution device of the conventional transmission shown in FIG. 2, which is in the form of a planetary gear unit.

Referring to FIG. 3, the power distribution device 23 is configured as a planetary gear unit, and includes a sun gear 231, four planetary gears 232, and a ring gear 233. The power distribution device 23 can transmit power from the engine 21 to the output shaft 25 via the speed reduction gear unit 24. The generator 22 can be activated by the power distribution device 23 to create and store electric energy within the storage battery unit 27. When the motor vehicle moves at a low speed, the engine 21 is stopped so that the motor vehicle is driven solely by the motor 28, thereby offering a comparatively large torque output to the output shaft 25. When the motor vehicle moves at a medium speed, it is driven solely by the engine 21. When the motor vehicle moves at a high speed, it is driven by both the engine 21 and the motor 28.

Both the generator 22 and the motor 28 are needed for the in-parallel connection type conventional transmission, thereby resulting in high manufacturing costs. Moreover, there is a need for high manufacturing precision and material strength of the power distribution device 23, thereby further increasing the manufacturing costs.

SUMMARY OF THE INVENTION

An object of this invention is to provide a transmission for a motor vehicle, which is inexpensive to manufacture.

Another object of this invention is to provide a transmission for a motor vehicle, which has a power distribution device that does not need high manufacturing precision and material strength.

According to this invention, a transmission for a motor vehicle includes a controller for controlling an engine, a generator and motor unit, a converter, and a storage battery unit. A detecting mechanism is used to detect the operating conditions of the motor vehicle and the engine so as to generate control signals. A power distribution device is disposed between the engine and the generator and motor unit. The generator and motor unit can be controlled to operate in one of a generator mode and a motor mode. As such, the generator and motor unit is cheaper than an assembly of a generator and a motor, thereby resulting in low manufacturing costs of the transmission.

In an embodiment, the power distribution device includes a belt and pulley unit that interconnects fixedly a motor shaft of the generator and motor unit and a high-speed output shaft.

In another embodiment, the power distribution device includes a connector that interconnects fixedly an end of the motor shaft and an end of the high-speed output shaft. As such, the power distribution device does not need high manufacturing precision and material strength.

BRIEF DESCRIPTION OF THE PREFERRED EMBODIMENT

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numbers throughout the entire disclosure.

Figure 4:
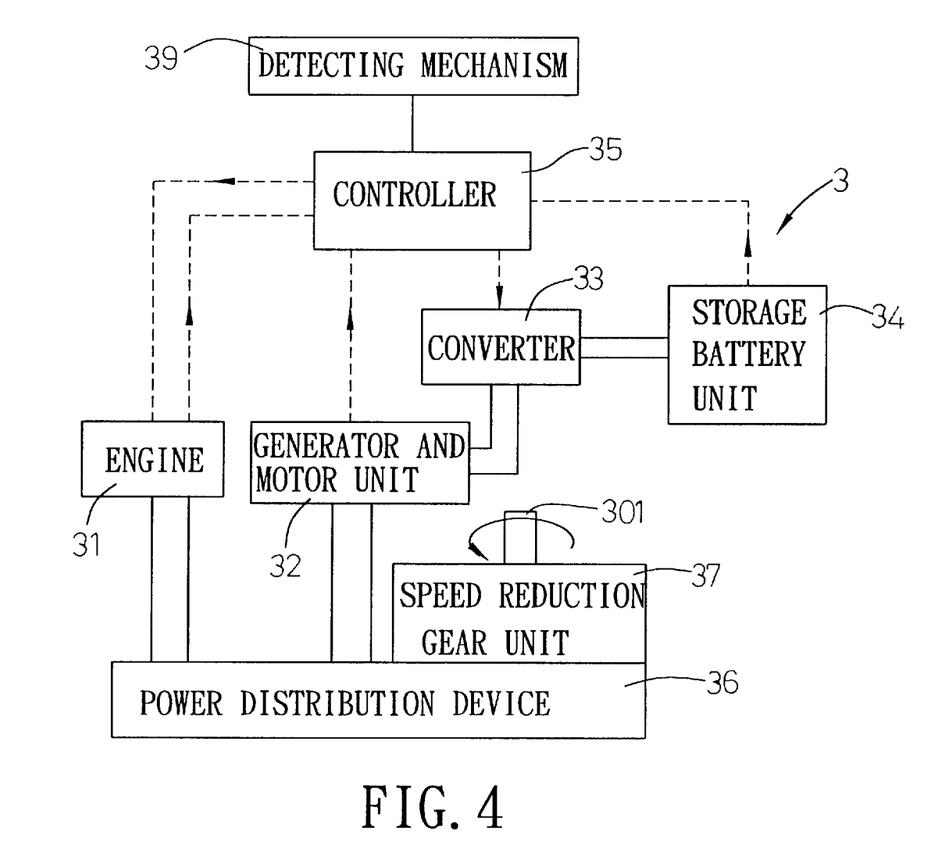
FIG. 4 is a block diagram showing a first preferred embodiment of a transmission for a motor vehicle according to this invention.

Referring to FIG. 4, a first preferred embodiment of a transmission 3 for a motor vehicle, such as motorcar and motorcycle, according to this invention is shown to include an engine 31, a generator and motor unit 32, a converter 33, a storage battery unit 34, a controller 35, a power distribution device 36, a speed reduction gear unit 37, and a detecting mechanism 39. The controller 35 is connected to the engine 31, the generator and motor unit 32, the converter 33, the storage battery unit 34, and the detecting mechanism 39 so as to receive control signals from the detecting mechanism 39 for controlling the engine 31, the generator and motor unit 32, the converter 33, and the storage battery unit 34. The generator and motor unit 32 is connected in parallel to the engine 31. The converter 33 is disposed between the generator and motor unit 32 and the storage battery unit 34 so as to enable electrical energy generated by the generator and motor unit 32 to be stored within the storage battery unit 34 when the generator and motor unit 32 is controlled by the controller 35 to operate in a generator mode. Alternatively, the generator and motor unit 32 can be controlled by the controller 35 to operate in a motor mode so as to convert the electrical energy stored within the storage battery unit 34 into dynamic energy. The engine 31 is connected to the generator and motor unit 32 by the power distribution device 36. The detecting mechanism 39 includes a plurality of sensors (not shown) for detecting the residual charge in the storage battery unit 34, the position of an accelerator pedal (not shown), and the running state of the engine 31.

Figure 5:
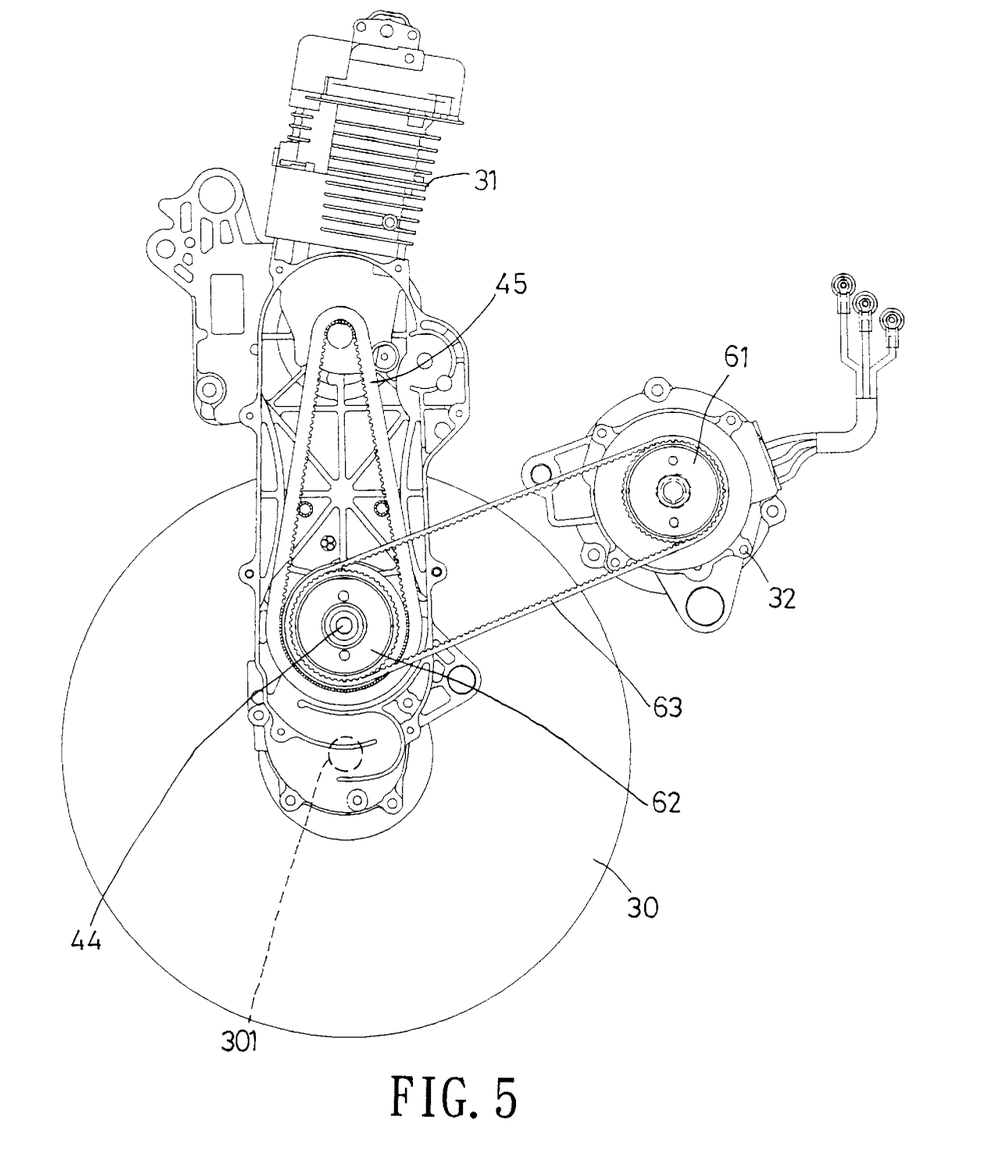
FIG. 5 is a side view of the first preferred embodiment, illustrating the arrangement of an engine and a generator and motor unit.

Referring to FIGS. 4, 5, 6, and 7, the first preferred embodiment further includes a high-speed output shaft 44, a low-speed output shaft 301, and a clutch device. The speed reduction gear unit 37 interconnects the high-speed output shaft 44 and the low-speed output shaft 301 so as to transfer rotation of the high-speed output shaft 44 to the low-speed output shaft 301 at a speed smaller than that of the high-speed output shaft 44. Two vehicle wheels 30 (only one is shown in FIG. 5) are connected fixedly to the low-speed output shaft 301. As such, the low-speed output shaft 301 can be driven by the engine 31 and/or the generator and motor unit 32. The power distribution device 36 includes a motor pulley 361 that is sleeved fixedly on a motor shaft 321 of the generator and motor unit 32, an output pulley 362 that is sleeved fixedly on the high-speed output shaft 44, and a short V-belt 363 that is trained between the motor pulley 361 and the output pulley 362.

Figure 6:
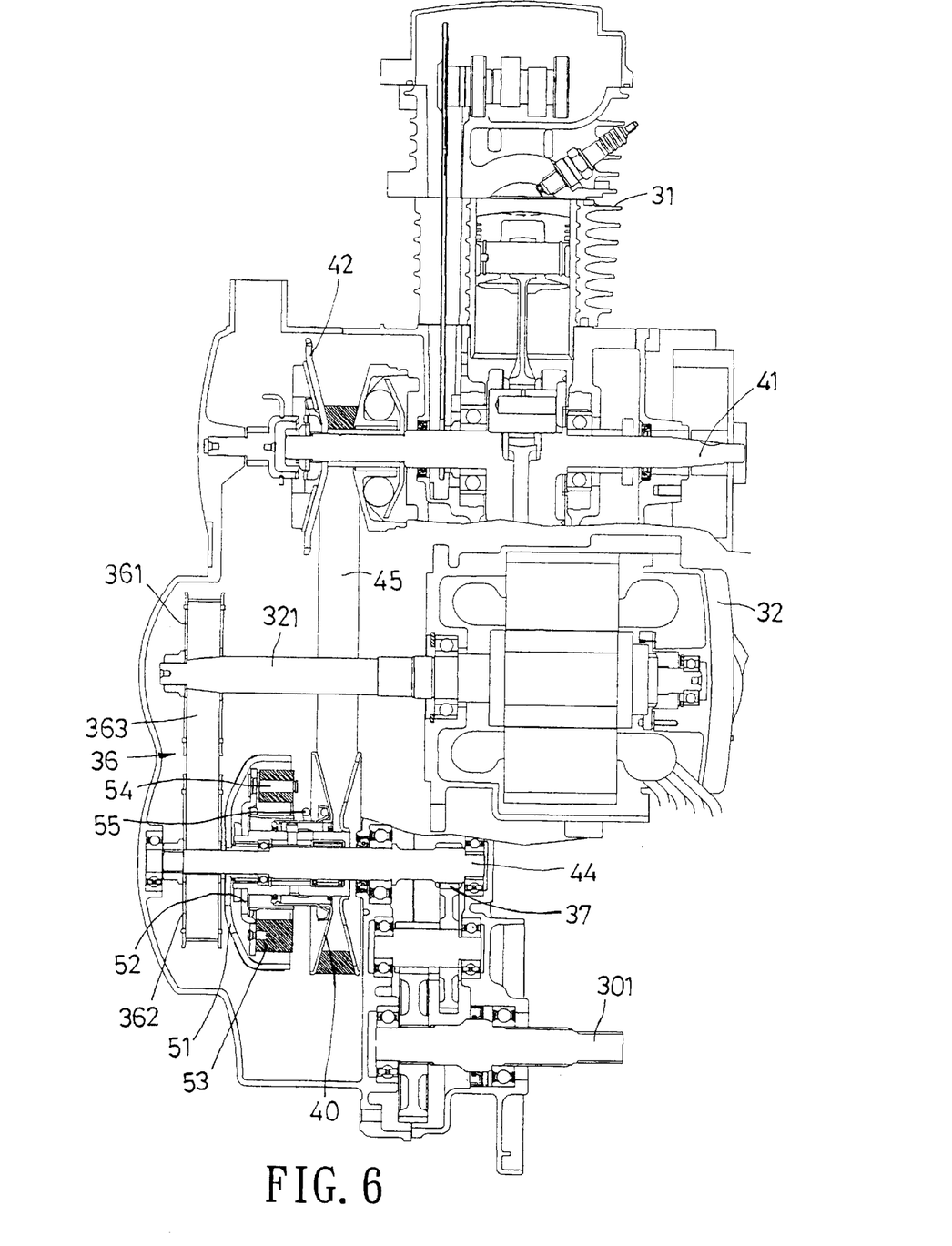
FIG. 6 is a schematic view of the first preferred embodiment, illustrating a power distribution device that is constructed as a belt and pulley unit.
Figure 7:
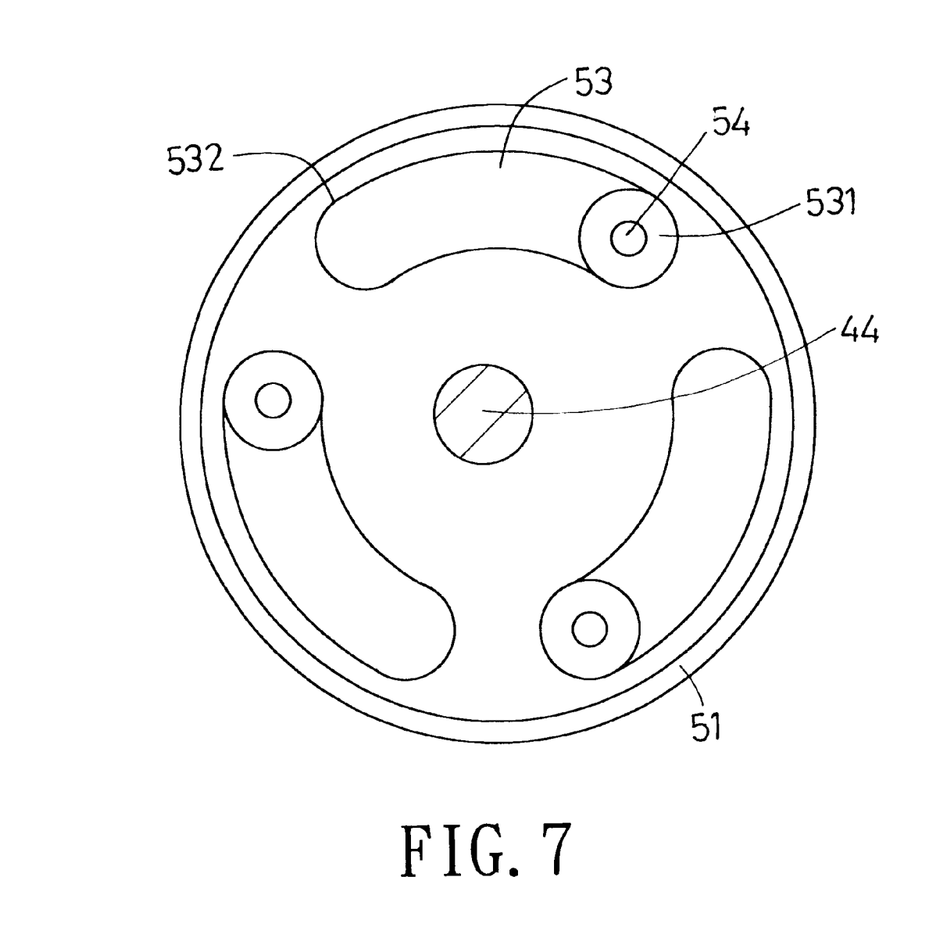
FIG. 7 is a fragmentary schematic view of a clutch device of the first preferred embodiment, illustrating how three swing arms are disposed between a casing and a support ring.

The engine 31 is provided with a crankshaft 41 in a known manner for outputting dynamic energy of the engine 31. The clutch device includes a crankshaft pulley 42, a rotatable pulley 40, a long V-belt 45, a casing 51, a support ring 52, a plurality of swing arms 53, and a coiled high-rigidity spring 55. The crankshaft pulley 42 is attached non-rotatably to the crankshaft 41. The rotatable pulley 40 is sleeved rotatably on the high-speed output shaft 44. The long V-belt 45 is trained between the crankshaft pulley 42 and the rotatable pulley 40. The support ring 52 is sleeved rotatably on the high-speed output shaft 44. The casing 51 is sleeved fixedly on the high-speed output shaft 44, and surrounds the support ring 52. The spring 55 is fastened to the rotatable pulley 40 at one end and to the support ring 52 at the other end so as to transfer rotation between the rotatable pulley 40 and the support ring 52. A stepless speed change device cooperates with the clutch device, and is capable of being actuated to move the long V-belt 45 relative to the crankshaft 41 and the high-speed output shaft 44 between an upper limit position, where the high-speed output shaft 44 rotates at a high speed, and a lower limit position, where the high-speed output shaft 44 rotates at a low speed. Each of the swing arms 53 has a pivot end 531 that is connected pivotally to the support ring 52 by a pivot pin 54, and a free end 532 that is spaced apart from the casing 51 when the rotational speed of the support ring 52 is smaller than a predetermined speed and that turns outward to press against the casing 51 by virtue of centrifugal force when the rotational speed of the support ring 52 is larger than a predetermined speed so as to rotate the casing 51 synchronously with the support ring 52, thereby transferring torque from the crankshaft 41 to the high-speed output shaft 44. As such, a torque can be transmitted to the high-speed output shaft 44 by the motor shaft 321 and/or the crankshaft 41.

By actuating a selection switch (not shown), the transmission 3 can be operated under the control of the controller 35 in one of the following two output modes:

1. A First Mode:
   (1) When it is detected that the acceleration pedal (not shown) has been actuated but not yet moved to a predetermined position, no torque is outputted from the motor shaft 321 of the generator and motor unit 32 under the control of the controller 35. As such, the motor vehicle is driven solely by the engine 31.
   (2) When non-operation of the engine 31 is detected, the generator and motor unit 32 is activated to operate in a motor mode. Hence, the motor vehicle is driven solely by the generator and motor unit 32 so as to move at a comparatively low speed.
   (3) When it is detected that the acceleration pedal (not shown) is moved downward to the predetermined position, the generator and motor unit 32 is activated to operate in a motor mode. Hence, the motor vehicle is driven by both the engine 31 and the generator and motor unit 32.
   (3) When it is detected that the residual charge in the storage battery unit 34 has dropped to a predetermined value, the generator and motor unit 32 is activated to operate in a generator mode, and a portion of the power output of the engine 31 is transmitted to the generator and motor unit 32 so as to generate alternating current, which is converted into direct current by the converter 33 and which is then stored within the storage battery unit 34 until the storage battery unit 34 reaches a fully charged condition.
2. A Second Mode:
   (1) When it is detected that the speed of the motor vehicle is smaller than a preset speed, the engine 31 is stopped, and the generator and motor unit 32 is activated to operate in a motor mode. Hence, the motor vehicle is driven solely by the generator and motor unit 32.
   (2) When it is detected that the speed of the motor vehicle is larger than the preset speed and that the acceleration pedal (not shown) has not yet moved to its lower limit position, no torque is outputted from the motor shaft 321 of the generator and motor unit 32 under the control of the controller 35. As such, the motor vehicle is driven solely by the engine 31.
   (3) When the acceleration pedal (not shown) is moved to the lower limit position, the generator and motor unit 32 is activated to operate in a motor mode. Hence, the motor vehicle is driven by both the engine 31 and the generator and motor unit 32.
   (4) When it is detected that the residual charge in the storage battery unit 34 has dropped to a predetermined value, the generator and motor unit 32 is activated to operate in a generator mode, and a portion of the power output of the engine 31 is transmitted to the generator and motor unit 32 so as to generate alternating current, which is converted into direct current by the converter 33 and which is then stored within the storage battery unit 34 until the storage battery unit 34 reaches a fully charged condition.

Two stepping motors (not shown) are disposed to control the opening sizes of an intake valve (not shown) and an oil valve (not shown), which are associated with the engine 31. Two actuators (not shown) are connected operably to the stepping motors (not shown) and the controller 35 so as to activate the stepping motors (not shown) when receiving control signals from the controller 35 during the operation of the transmission 3 in the second mode.

Figure 8:
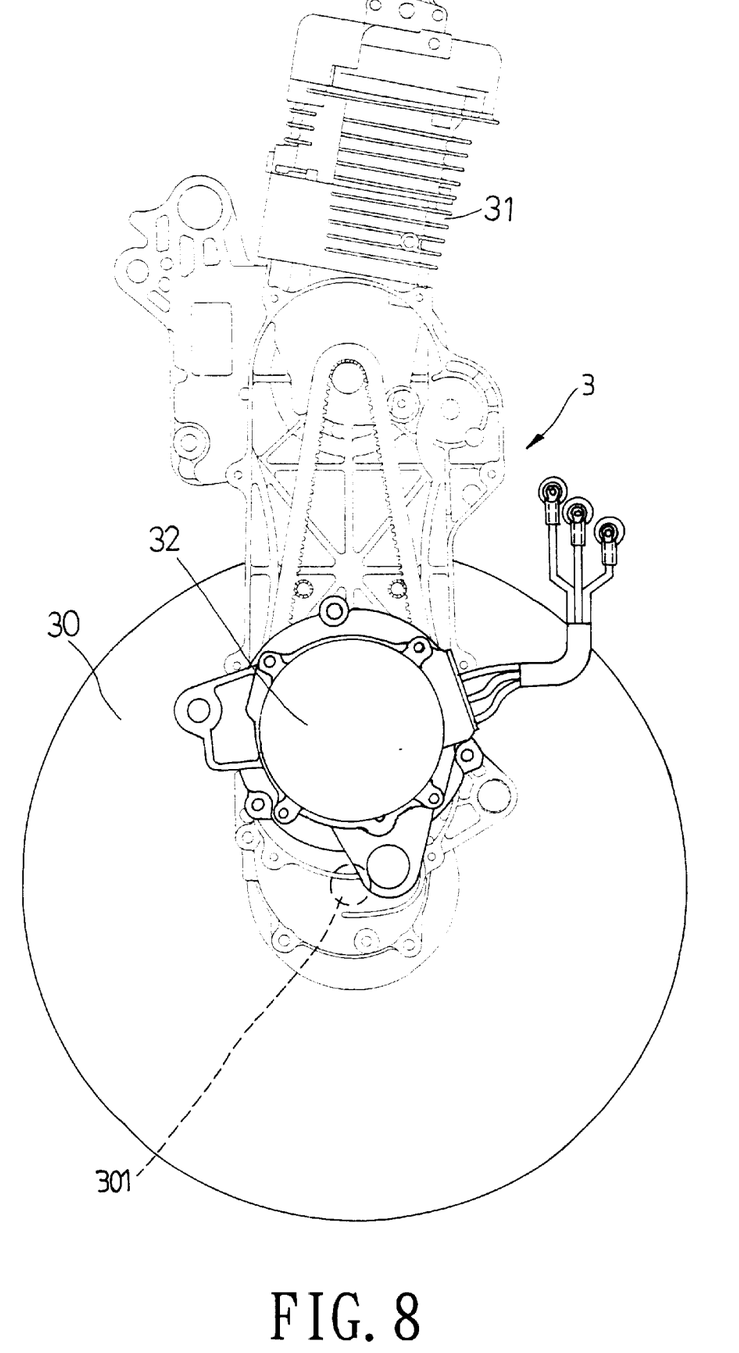
FIG. 8 is a side view showing a second preferred embodiment of a transmission for a motor vehicle according to this invention and illustrating the arrangement of an engine and a generator and motor unit.
Figure 9:
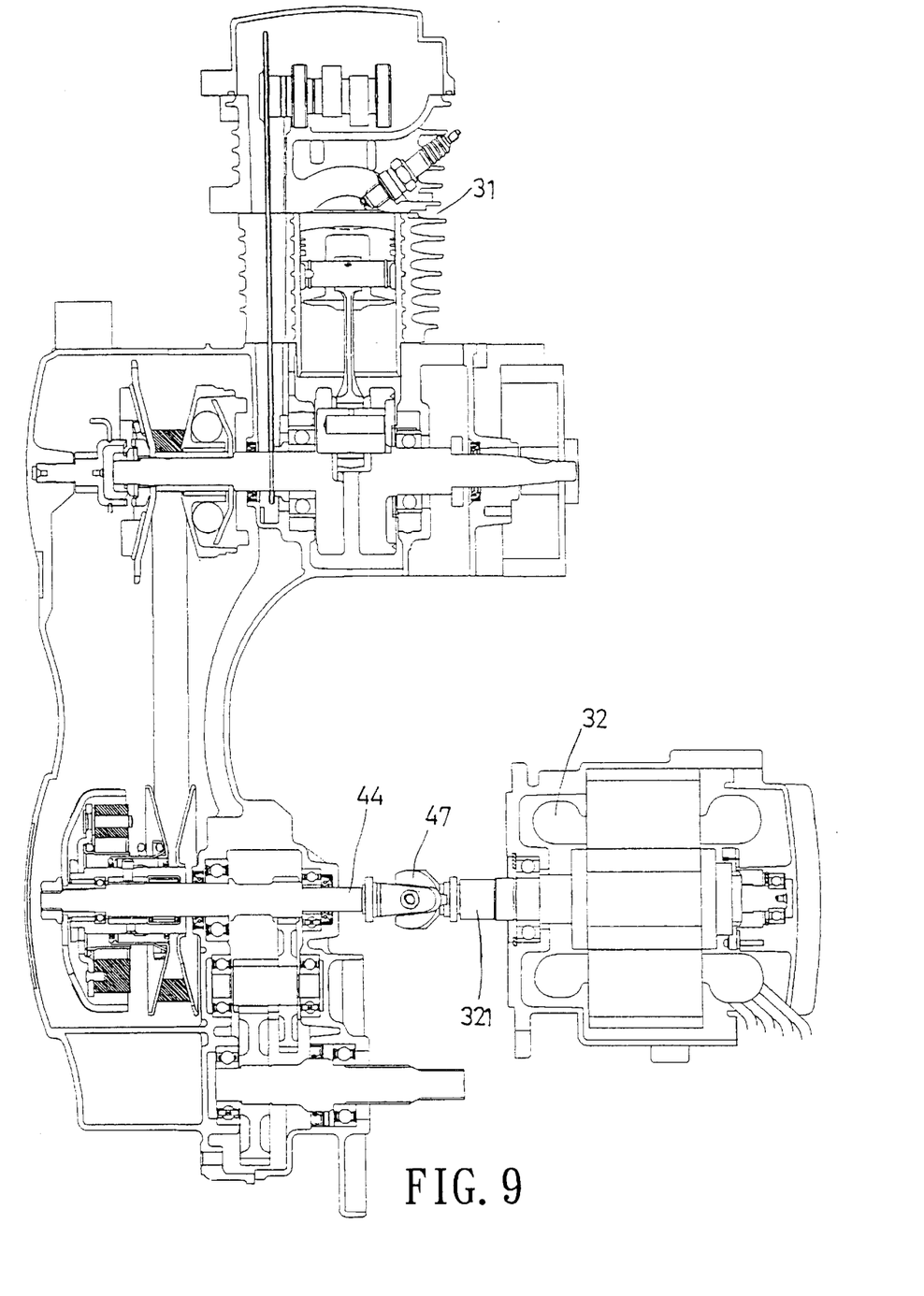
FIG. 9 is a partly sectional view of the second preferred embodiment, illustrating a modified power distribution device that is constructed as a connector.

FIGS. 8 and 9 show a second preferred embodiment of this invention, which is similar to the first preferred embodiment in construction except that power distribution device is modified to include a connector 47 that connects an end of the high-speed output shaft 44 fixedly to an end of the motor shaft 321.

As the generator and motor unit 32 is configured as a single machine in the present invention, the transmission 3 has a comparatively compact size as compared with the aforesaid prior art. Furthermore, high manufacturing precision and material strength are not needed for the power transfer device of this invention. The objects of this invention can thus be achieved.

With this invention thus explained, it is apparent that numerous modifications and variations can be made without departing from the scope and spirit of this invention. It is therefore intended that this invention be limited only as indicated by the appended claims.

We claim:

1. A transmission for a motor vehicle, the motor vehicle including an engine, and a crankshaft that is connected to the engine so as to output dynamic energy of the engine therethrough, said transmission comprising:

a generator and motor unit controllable to operate in one of a generator mode and a motor mode and having a motor shaft;

a storage battery unit for storing electrical energy;

a converter for interconnecting said generator and motor unit and said storage battery unit so as to control flow of electric current into and out of said generator and motor unit;

a detecting mechanism for detecting residual charge in said storage battery unit, and running state of the engine to generate control signals therefrom;

a controller adapted to be connected to said detecting mechanism, the engine, said storage battery unit, said converter, and said generator and motor unit for controlling running of the engine, and transmitting direction of electrical energy in said generator and motor unit according to said signals received from said detecting mechanism;

a high-speed output shaft;

a power distribution device adapted to transmit dynamic energy of the engine to said high-speed output shaft so as to rotate said motor shaft and for transmitting dynamic energy of said generator and motor unit to said high-speed output shaft via said motor shaft; and a clutch device including a crankshaft pulley adapted to be sleeved non-rotatably on the crankshaft, a rotatable pulley sleeved rotatably on said high-speed output shaft, a long V-belt trained between said crankshaft pulley and said rotatable pulley, a support ring sleeved rotatably on said high-speed output shaft, a coiled high-rigidity spring fastened to said rotatable pulley at one end thereof, and to said support ring at the other end thereof, a casing sleeved fixedly on said high-speed output shaft and surrounding said support ring, and a plurality of swing arms connected pivotally to said support ring, each of said swing arms having a free end that is spaced apart from said casing when rotational speed of said support ring is smaller than a predetermined speed and that turns outward to press against said casing when the rotational speed of said support ring is larger than said predetermined speed so as to rotate said casing synchronously with said support ring, thereby transferring torque from said crankshaft to said high-speed output shaft.

2. The transmission as claimed in claim 1, wherein said power distribution device includes:

a motor pulley sleeved fixedly on said motor shaft;

an output pulley sleeved fixedly on said high-speed output shaft; and a short V-belt trained between said motor pulley and said output pulley for transferring rotation between said motor shaft and said high-speed output shaft.

3. The transmission as claimed in claim 1, wherein said power distribution device includes a connector for connecting an end of said high-speed output shaft fixedly to an end of said motor shaft.

* * * * *